United States Patent
Lee

(10) Patent No.: US 9,236,072 B1
(45) Date of Patent: Jan. 12, 2016

(54) SERVO CONTROL USING A MODEL OF TEMPERATURE-DEPENDENT FRICTION

(71) Applicant: Seagate Technology LLC, Cupertino, CA (US)

(72) Inventor: Ju-Il Lee, Eden Prairie, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/736,731

(22) Filed: Jun. 11, 2015

(51) Int. Cl.
| G11B 5/596 | (2006.01) |
| G11B 5/55 | (2006.01) |
| G05B 13/04 | (2006.01) |

(52) U.S. Cl.
CPC ............ *G11B 5/5565* (2013.01); *G11B 5/5547* (2013.01); *G11B 5/5552* (2013.01); *G05B 13/042* (2013.01)

(58) Field of Classification Search
None
See application file for complete search history.

(56) References Cited

U.S. PATENT DOCUMENTS

| 6,636,375 B1 | 10/2003 | Ding et al. |
| 6,937,430 B2 * | 8/2005 | Ge ...................... G11B 5/5565 318/561 |
| 7,440,225 B1 | 10/2008 | Chen et al. |
| 8,442,692 B2 | 5/2013 | Okitsu et al. |

FOREIGN PATENT DOCUMENTS

CN   201611867 U   10/2010

* cited by examiner

*Primary Examiner* — K. Wong
(74) *Attorney, Agent, or Firm* — Hollingsworth Davis, LLC

(57) ABSTRACT

A first friction coefficient that is modeled as affecting a rotational velocity of a voice coil motor is modified. A second friction coefficient that is modeled as affecting a rotational acceleration of the voice coil motor is also modified. The first and second friction coefficients change in response to a change in ambient temperature. A control effort used to control the voice coil motor is changed based on the modified first and second friction coefficients.

20 Claims, 11 Drawing Sheets

SERVO CONTROL USING A MODEL OF TEMPERATURE-DEPENDENT FRICTION

SUMMARY

Various embodiments described herein are generally directed to servo control using a model of temperature-dependent friction. In one embodiment, a first friction coefficient that is modeled as affecting a rotational velocity of a voice coil motor is modified. A second friction coefficient that is modeled as affecting a rotational acceleration of the voice coil motor is also modified. The first and second friction coefficients change in response to a change in ambient temperature. A control effort used to control the voice coil motor is changed based on the modified first and second friction coefficients.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

Hard disk drives utilize actuators (e.g., voice coil motor) that position a read/write head over a disk surface. For example, a dual-stage actuator utilizes a voice coil motor that rotates an arm, a read/write head being positioned at the far end of the arm. The dual-stage actuator also includes a microactuator (e.g., piezo-actuator) that causes small displacements of the read/write head. A dual-stage servo control system generally uses the voice coil motor for large displacements (e.g., track seeks) and the microactuator for fine adjustments (e.g., track following).

The voice coil motor can have a significant influence on servo system performance during certain operations such as track seeks. For example, seek time can be the largest part of the total completion time for operations such as random read and writes. The present disclosure relates to issues that can affect bearing friction of voice coil motor, which can negatively impact seek performance of hard disk drives.

Friction from the actuator pivot bearing can adversely affect drive performance. While the servo system can compensate for friction within some predefined range, if the friction changes over time or under some environmental conditions, the effectiveness of servo compensation can decrease, leading to longer seek times. For example, it has been found that certain bearing grease can have a significant change in viscosity at low temperature, which can impact seek performance.

Figure 1:
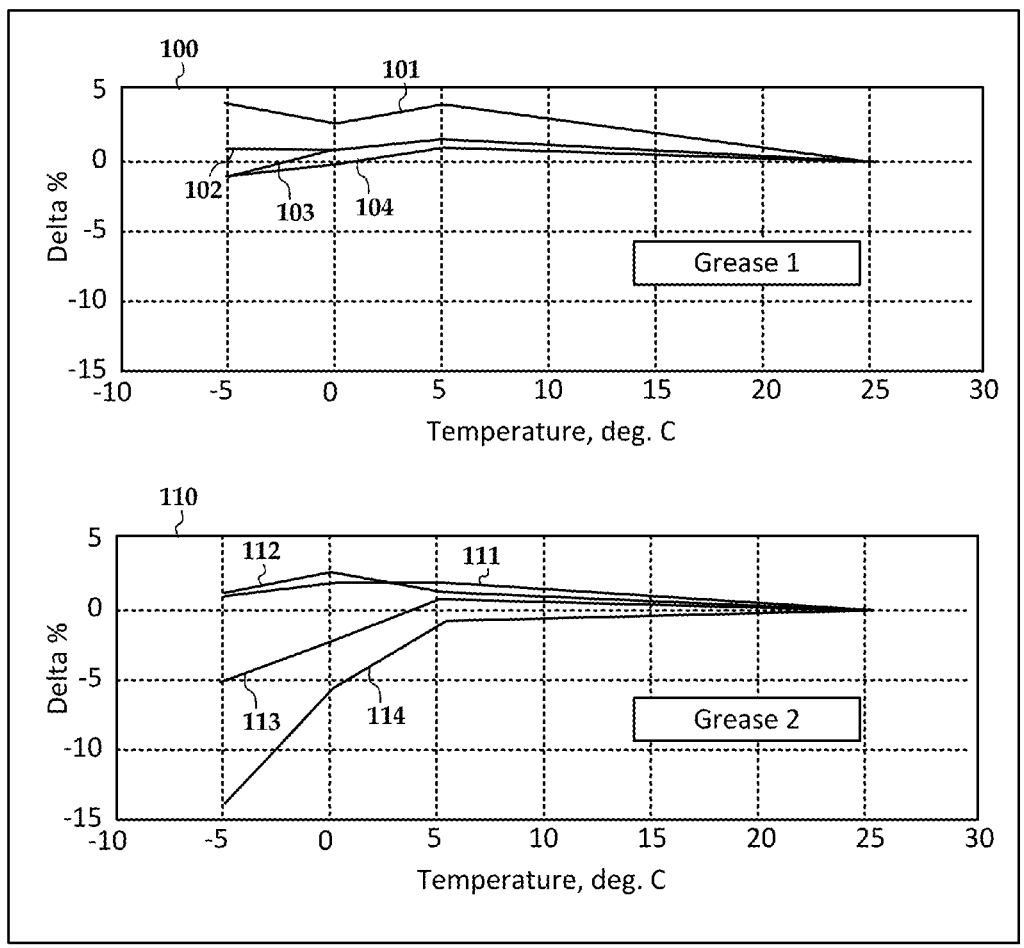
FIG. 1 is a set of graphs showing effects of temperature on seek performance for different actuator greases used in a data storage device according to an example embodiment.

In FIG. 1, a pair of graphs 100, 110 illustrate how temperature can affect seek performance for different types of actuator bearing grease in equivalent data storage devices according to example embodiments. In graphs 100 and 110 the curves 101-104 and 111-114, respectively, represent performance for instruction queue depth of 1, 4, 16, and 64, respectively. Generally, an instruction queue may act as a buffer between a system controller that processes storage commands (e.g., reads and writes) and a servo processor that moves the read/write head to fulfill the commands. When a large number of commands are queued up, the queue may be reordered to minimize the size of the seeks needed to fulfill the queued commands. Therefore, the seek distance may generally be inversely proportional to the queue depth. As such, issues that affect settling on a track will have relatively high impact for larger queue depth, and relatively less impact for small queue depth.

In graph 100, the performance was obtained from data storage device used a lower molecular weight grease with the actuator pivot compared to the device in graph 110, which used a higher molecular weight grease. The vertical axes of the graphs 100, 110 represent a percentage of change in the number of input/output operations per second (IOPS) that the system was capable of performing relative to a 25° C. baseline. Expression (1) below shows how Delta (%) was obtained.

$$\text{Delta}(\%) = \frac{IOPS_{[T]} - IOPS_{[T=25C]}}{IOPS_{[T=25C]}} \times 100 \quad (1)$$

As indicated by comparing curves 104 and 114, for example, the higher molecular weight grease results in a reduction in IOPS at low temperatures. This effect is more pronounced for the highest queue depth of 64 (curve 114) because increased friction of the grease may increase the time it takes to locate and settle on a target track. Nonetheless, this higher molecular weight grease may have other advantages (e.g., reduced outgassing), and so example embodiments described below include features to compensate for the low temperature performance of higher molecular weight grease.

Figure 2:
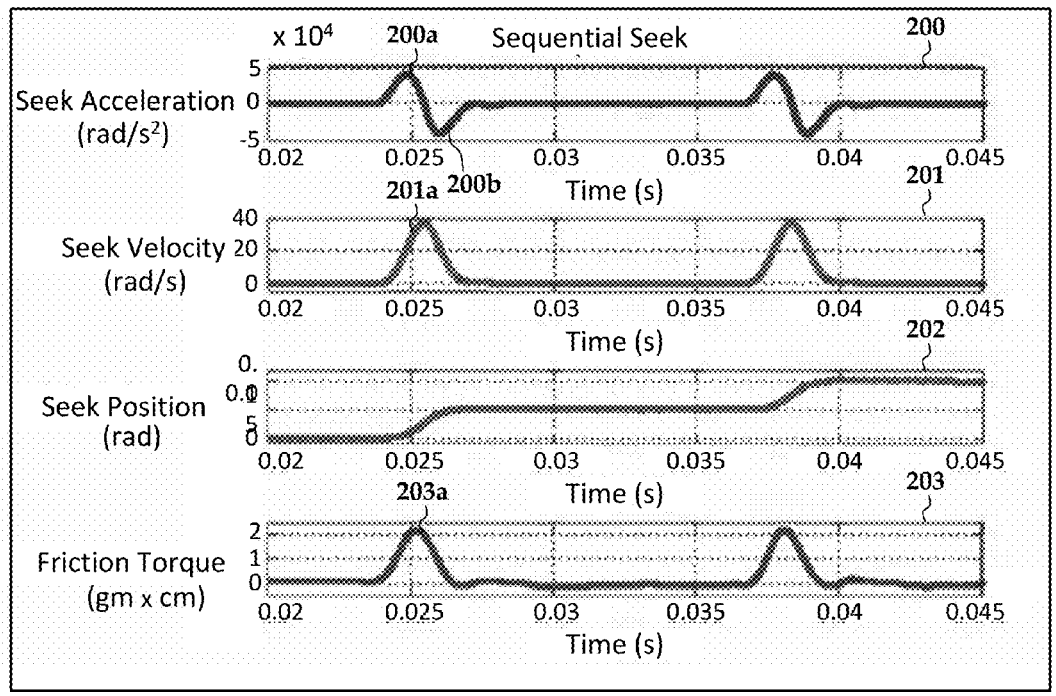
FIGS. 2 and 3 are graphs showing seek friction measurements according to an example embodiment.

In reference now to FIG. 2, graphs 200-203 illustrate additional details of seek performance of a disk drive device according to an example embodiment. The data in graphs 200-203 was measured during a series of 0.05 radian seeks in a representative disk drive device. In this device, a 0.05 sequential seek covers about 15 k to 25 k tracks. The data in graph 203 was obtained using a component-level dynamic bearing friction measurement apparatus.

Graph 202 shows the radial position for each of the two seeks. Graphs 201 and 200 respectively show the velocity and acceleration peaks associated with the seek operations. Note that for each seek, the acceleration curve exhibits a positive peak (e.g., peak 200a) as the arm accelerates away from the current track and then a negative peak (e.g., peak 200b) as the arm decelerates as it approaches the target track. As seen by the friction curve in graph 203, the peaks (e.g., peak 203a) closely resembles the velocity peaks (e.g., peak 201a), although the peak 203a is shifted in time slightly to the left relative to peak 201a, indicating acceleration also contributed to the friction.

Figure 3:
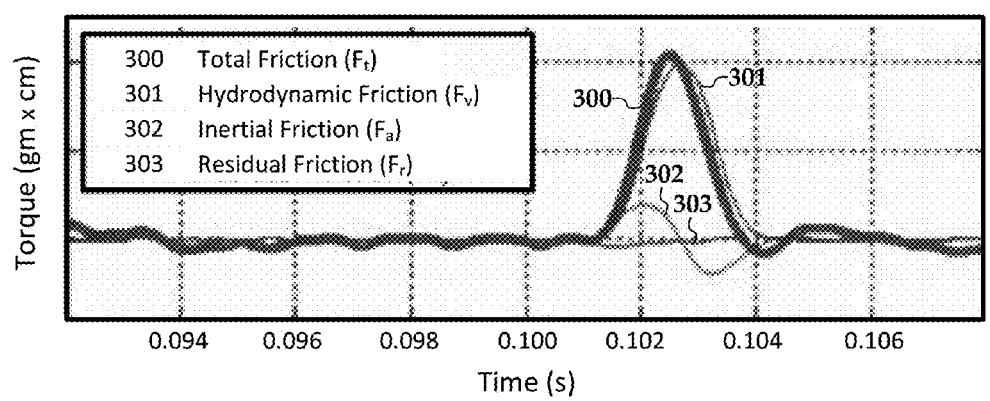

In view of the measurements shown in FIG. 2, a servo control system is described that utilizes parametric friction model as shown below in Expressions (2)-(4) below. The total friction $F_t$ in Expression (2) is the sum of: hydrodynamic friction $F_v$ shown in Expression (3); inertial friction due to acceleration $F_a$ shown in Expression (4); and residual friction $F_r$, which is due to other ball/grease motions and is relatively constant at least relative to velocity and acceleration. In Expression (3), v is velocity, $v_c$ is a reference velocity, and $\sigma_v$ is a friction coefficient. In Expression (4), a is acceleration and $\sigma_a$ is a friction coefficient. The friction components $F_t$, $F_v$, $F_a$, and $F_r$ are plotted in the respective time domain curves 300-303 in the graph of FIG. 3.

$$F_t = F_v + F_a + F_r \quad (2)$$

$$F_v = \sigma_v e^{-\left(\frac{v}{v_c}\right)^2} v \quad (3)$$

$$F_a = \sigma_a a \quad (4)$$

Figure 4:
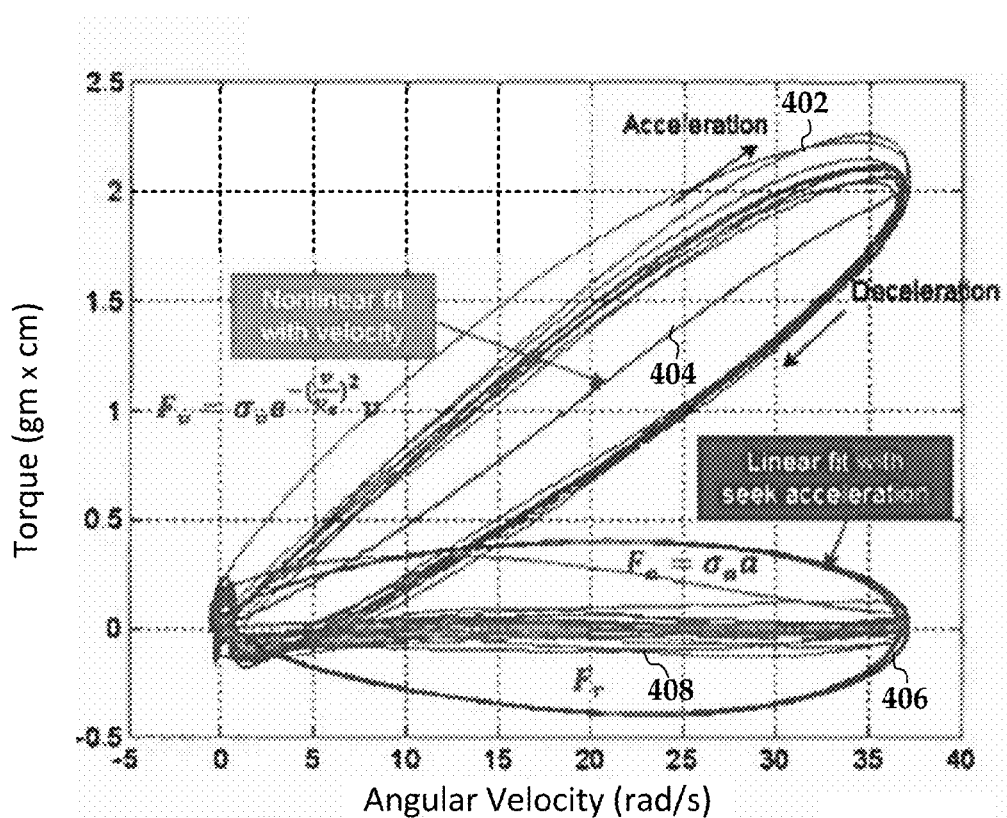
FIGS. 4, 5, and 6 are graphs showing modeled components of friction as a function of rotational velocity according to an example embodiment.

In FIG. 4, a graph of torque versus angular/rotational velocity shows how the various friction components are modeled. Trace 402 represents measurements of total friction affecting a bearing of a representative disk drive device. Trace 404 represents a non-linear fit of hydrodynamic friction from lubricant fluid according to Expression (3) above. The exponential nonlinearity accounts for a slight slope decrease at high velocities, which can be due to change in damping characteristics at high velocities where more lubricant is being forced into the ball/race interface. Trace 406 represents a linear fit of the resistant torque due to inertia from ball and/or lubricant fluid.

Figure 5:
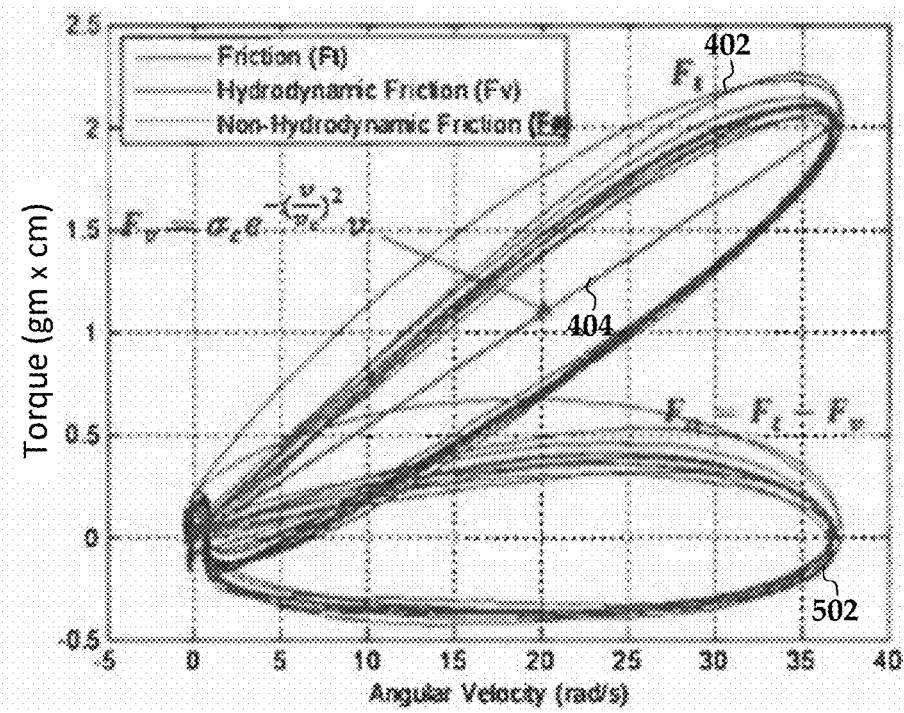
Figure 6:
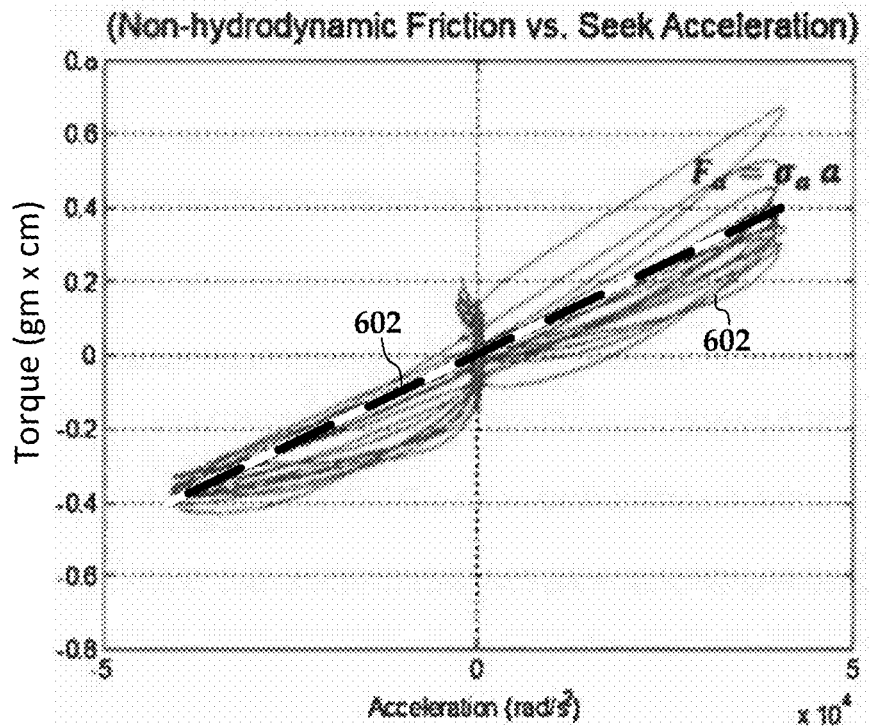

In FIG. 5, a graph shows a trace 502 that results from subtracting the hydrodynamic friction 406 from the total friction 402 of FIG. 4, both of which are reproduced in FIG. 5. Curve 502 will also contain some components of residual friction. The similarities between curve fit 406 in FIG. 4 and curve 502 in FIG. 5 illustrate the correspondence between the measurements and the modeling of inertial friction according to Expression (4) above. In FIG. 6, a graph shows the data of curve 502 plotted as a function of angular acceleration, resulting in trace 602. Dashed line 604 is the linear fit of this data.

Figure 7:
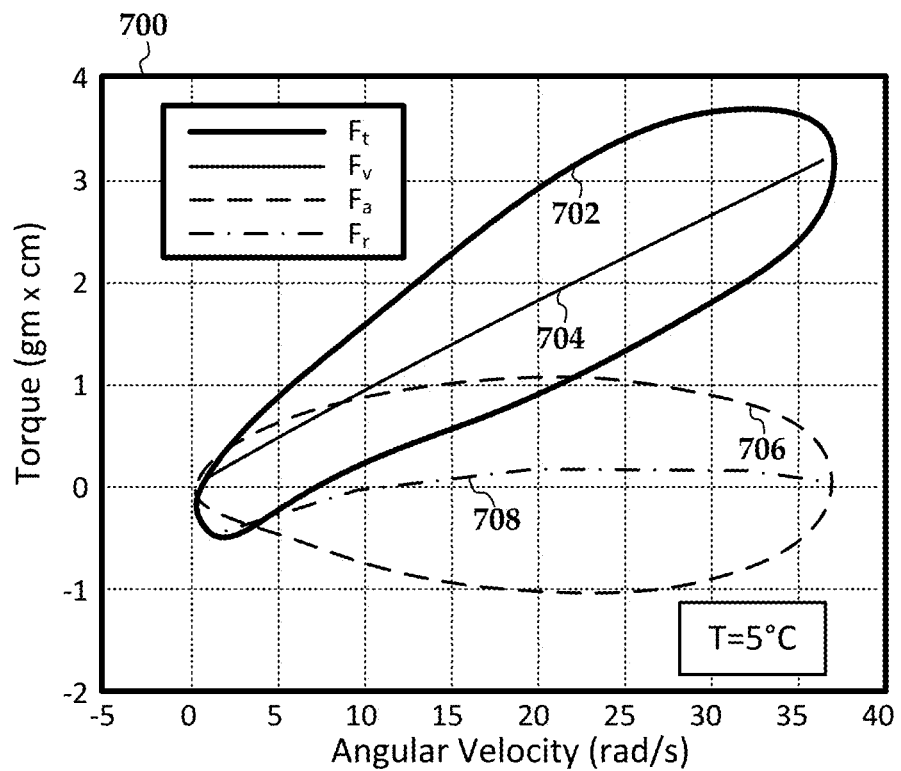
FIGS. 7, 8, and 9 are graphs showing effects of temperature modeled components of friction as a function of rotational velocity according to example embodiments.
Figure 8:
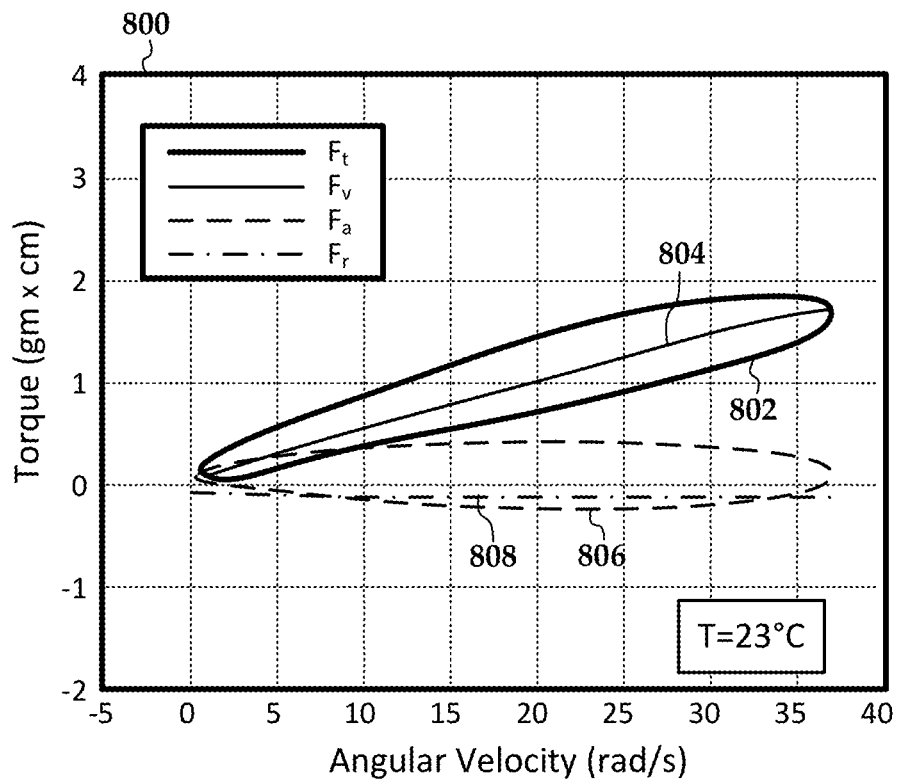
Figure 9:
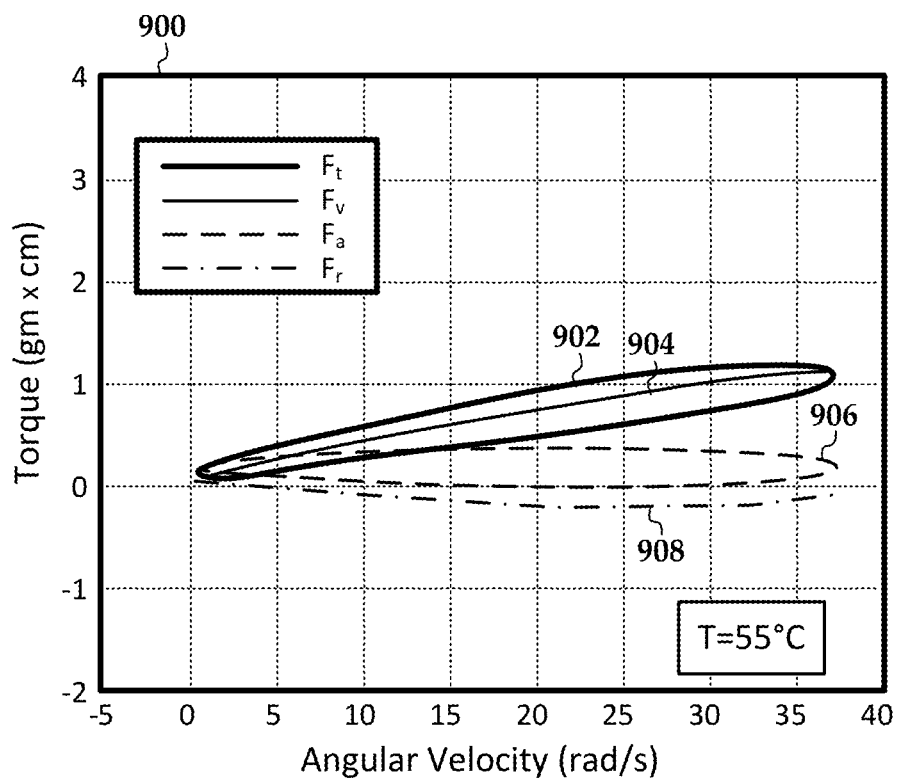

Referring back to FIG. 4, trace 408 is the residual friction component, which is obtained by subtracting the fit of hydrodynamic friction 404 and the fit of inertial friction 406 from total friction 402. The residual friction component 408 is relatively constant as a function of angular velocity. Generally, by decomposing seek-induced friction into three components (hydrodynamic/viscous, inertial, residual), an accurate model of temperature-dependent friction can be used in servo control. In FIGS. 7-9, graphs illustrate the effects of temperature on the three different friction components.

Figure 10:
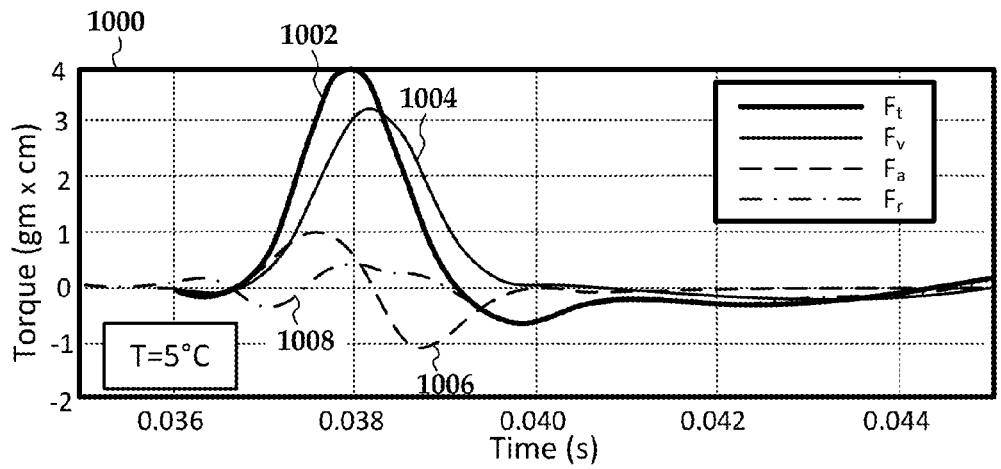
FIGS. 10, 11, and 12 are graphs showing effects of temperature modeled components of friction as a function of time according to example embodiments.
Figure 11:
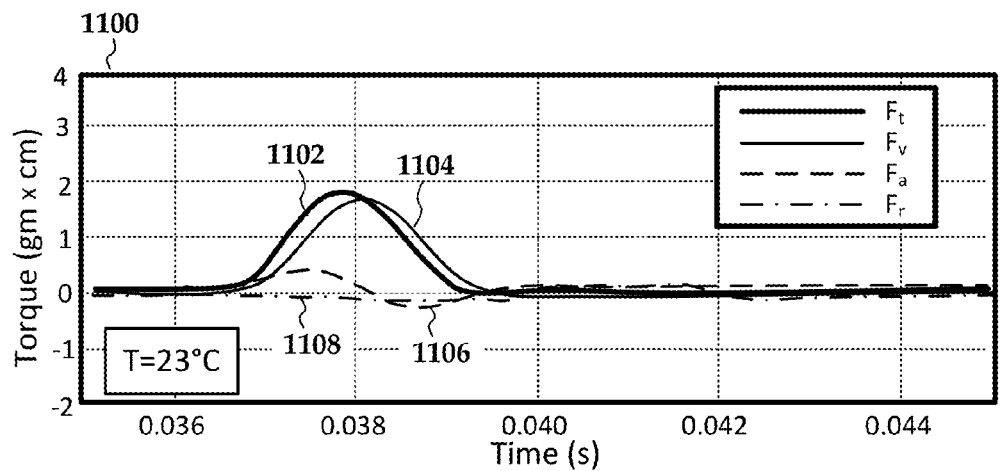
Figure 12:
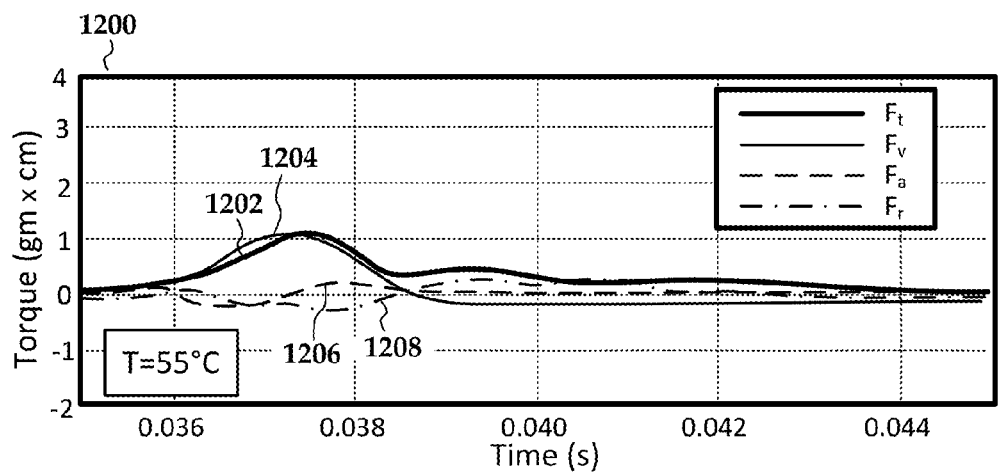

In graphs 700, 800, 900 in FIGS. 7-9, friction components analogous to those shown in FIG. 4 are plotted for ambient temperatures of 5° C., 23° C., and 55° C., respectively. Specifically, curves 702, 802, 902 represent an average total friction, curves 704, 804, 904 represent fits of hydrodynamic friction, curves 706, 806, 906 represent fits of inertial friction, and curves 708, 808, 908 represent averages of residual friction. Similarly, graphs 1000, 1100, 1200 in FIGS. 10-12 are time domain plots of the friction components shown in FIGS. 7-9 for the same ambient temperatures of 5° C., 23° C., and 55° C., respectively. Specifically, curves 1002, 1102, 1202 represent total friction, curves 1004, 1104, 1204 represent hydrodynamic friction, curves 1006, 1106, 1206 represent fits of inertial friction, and curves 1008, 1108, 1208 represent the resulting residual friction.

Based on the results shown in FIGS. 7-12, it is apparent that, relative to 23° C., ambient temperature of 5° C. causes a significant increase in hydrodynamic friction (~70% in this example device) and inertial friction (~320% in this example device). For the 55° C. case, all friction components are reduced. This change in friction components can be shown numerically by comparing the values of parameters in Expressions (3) and (4). In Table 1 below, the relative values of these parameters, as well as an absolute value of residual friction $F_r$, are shown for each temperature.

TABLE 1

| Parameter | T = 5° C. | T = 23° C. | T = 55° C. |
|---|---|---|---|
| $\sigma_v$ | 0.092 | 0.054 | 0.043 |
| $v_c$ | 148 | 100 | 56 |
| $\sigma_a$ | 25.9 × 10⁻⁶ | 6.0 × 10⁻⁶ | −5.1 × 10⁻⁶ |
| $\|F_r\|$ | 0.159 | 0.073 | 0.108 |

Figure 13:
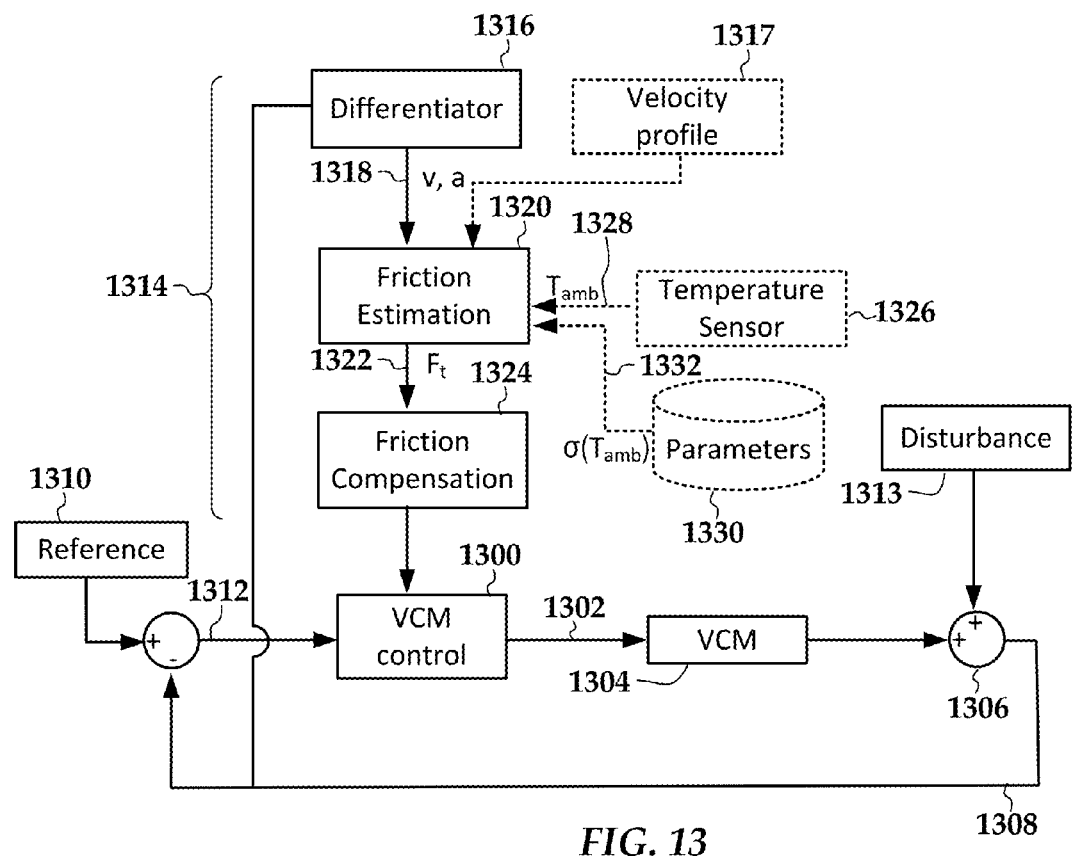
FIG. 13 is a control diagram of a servo control system according to an example embodiment.

In order to ensure consistent seek performance over a wide temperature range, a data storage device according to example embodiments may utilize a servo control system as shown in the block diagram of FIG. 13. Generally, a controller 1300 provides control signals 1302 that drive a voice coil motor (VCM) 1304. The VCM 1304 rotates in response to the control signal 1302, causing a change in position 1306 of a read/write head. The read/write head may be influenced by exogenous disturbances 1313 (e.g., vibration) that also affects its position. A reference input 1310 is a command that drives the read/write head to a particular position. The difference between the reference command 1310 and actual position 1308 is defined as position error signal (PES) 1312. The PES 1312 is fed back to the controller 1300, and the system attempts to maintain a zero value of PES 1312 during steady state operations, e.g., tracking.

The servo control system includes a friction compensator 1314 that compensates for temperature-dependent changes to the VCM 1304. A friction estimator 1320 estimates a current friction 1322 uses at least an estimation of rotational velocity and acceleration to estimate current friction 1322. One way of estimating rotational velocity and acceleration is to use a differentiator 1316 that reads the position signal 1308 (e.g., PES 1312) and provides an output 1318 that includes an estimation of rotational velocity v and rotational acceleration a. In the alternate, an estimate of velocity and acceleration may be obtained by other means, as indicated by velocity profile component 1317. Generally, the velocity profile component 1317 can estimate velocity and acceleration by secondary measures such as time to traverse servo wedges. In such a case, a known seek profile (which includes time-dependent velocity and acceleration data) can be fit to conform to the measured times, thereby providing an estimate of velocity and acceleration.

A compensation module 1324 modifies operation of the VCM controller 1300 based on the friction estimate 1322 provided by the friction estimator 1322. For example, the compensation module 1324 may alter various parameters (e.g., gain, skew rate, control effort) used by the VCM controller 1300 in order to ensure the VCM 1304 minimizes seek times. The compensation module 1324 may vary the amount of alteration/modification based on certain factors besides estimated friction 1322, such as ambient temperature, queue-depth, etc. In another example, the compensation module 1324 may be configured as a feedforward compensator.

In one example, the friction estimator 1320 uses an adaptive estimation of viscous and inertial friction models, the adaptive estimation updating the various friction coefficients on a per-seek basis. For the viscous model, the relation shown in Expression (3) above is used to form the model as shown in Expressions (5) and (6) below. Adaptive gain $\sigma_v(k)$ is estimated for each seek number k and is obtained as shown in Expressions (7) and (8) below. Similarly, an inertial friction adaptive model for the relation shown in Expression (4) above substitutes $\sigma_a(k)$ for in $\sigma_a$ with an adaptive gain shown in Expressions (9) and (10) below, where k again represents the seek number. In both Expressions (8) and (10), the summation of position error signal over v(j) is for velocities greater than $v_{threshold}$. Generally, this causes only relatively high velocity events to contribute to the adaptive parameter $X_{avg}^v$.

$$F_v = \sigma(v) \cdot v \qquad (5)$$

$$\sigma(v) = \sigma_v(k) e^{-\left(\frac{v}{v_c}\right)^2} \qquad (6)$$

$$\sigma_v(k+1) = \sigma_v(k) + \mu_v X_{avg}^v(k) \qquad (7)$$

$$X_{avg}^v(k) = \frac{1}{N} \sum_{|v(j)| > v_{threshold}} PES(j) \cdot \text{sign}(v(j)) \qquad (8)$$

$$\sigma_a(k+1) = \sigma_a(k) + \mu_a X_{avg}^a(k) \qquad (9)$$

$$X_{avg}^a(k) = \frac{1}{N} \sum_{|v(j)| > v_{threshold}} PES(j) \cdot \text{sign}(a(j)) \qquad (10)$$

The adaptive friction models described above do not require express measurements of temperature in order to operate. However, such a system may make use of such measurements instead of an adaptive model, and/or use such measurements as an alternate during initialization, safe mode, alternate control mode, etc. As shown in FIG. 13, a temperature sensor 1326 may be utilized to determine current ambient temperature 1328. A database 1330 may store temperature-dependent friction parameters 1332, which may be used as shown in Expressions (2)-(4) to estimate total friction. The temperature dependent friction parameters 1332 may be specific to a particular device, varying based on such factors as voice coil motor, voice coil motor lubricant/grease, number of arms and read/write heads, etc.

It will be understood that a servo system such as shown in FIG. 13 may include additional actuators (e.g., microactuators) and control components (e.g., disturbance compensation) that are not illustrated, and the illustrated friction compensation features may be applicable to servo systems that also include such features. For example, if the servo system is implemented as a multiple-stage controller, additional components (e.g., filters, plant models) may be used to determine separate contributions that different actuator stages velocity have on position 1308 in order to model velocity and acceleration that affect the VCM 1304 only.

Figure 14:
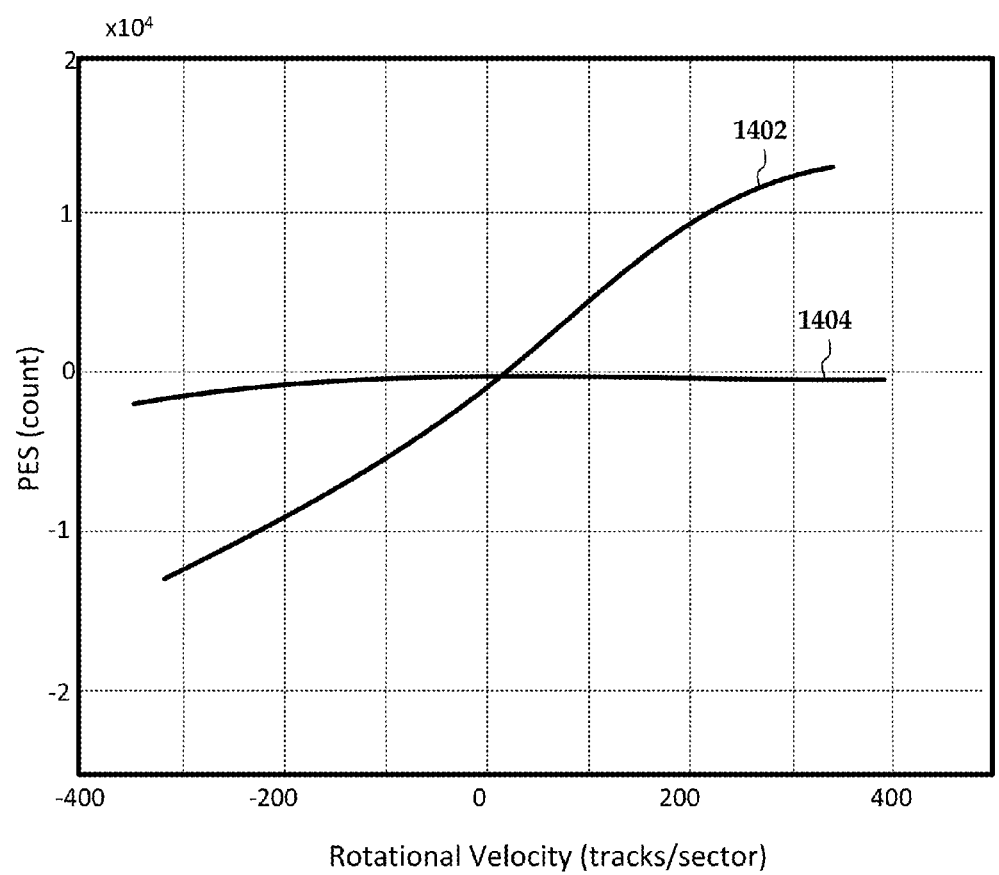
FIGS. 14, 15, and 16 are graphs comparing temperature compensated and temperature uncompensated servo control according to example embodiments.
Figure 15:
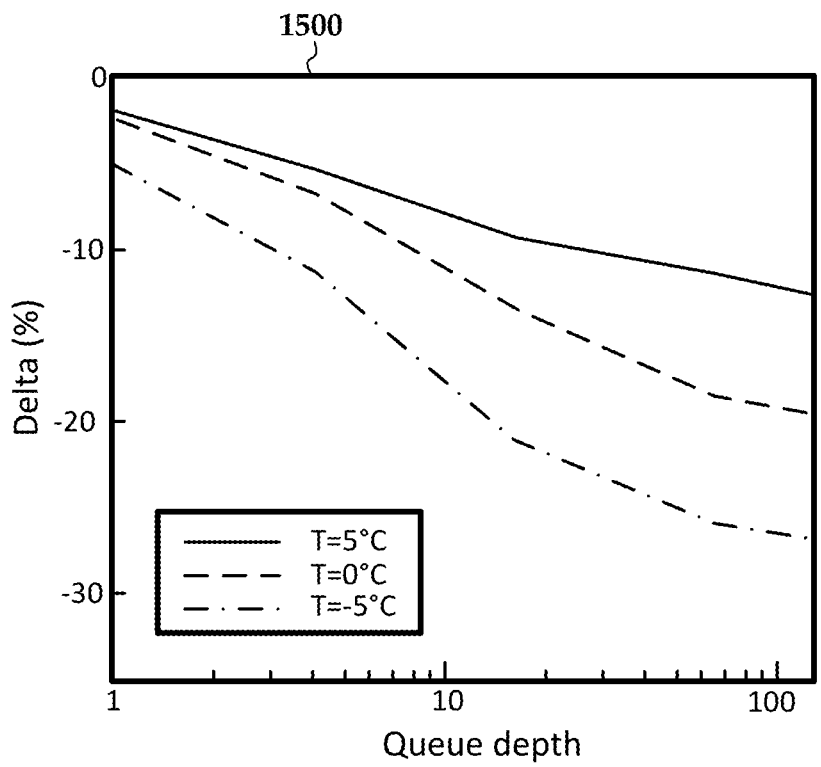
Figure 16:
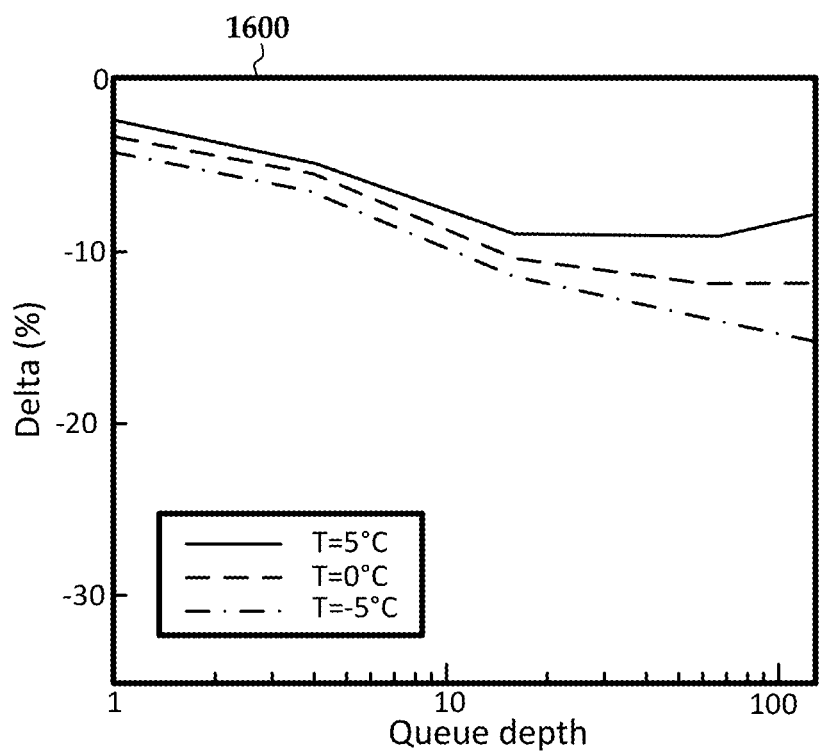

In FIGS. 14-16, graphs illustrate results of using adaptive friction compensation on a disk drive device according to an example embodiment. In FIG. 14, a graph compares position error (PES) during random seeks for friction-compensated servo control (curve 1404) and uncompensated servo control (curve 1402) at 10° C. ambient temperature. This improvement is most evident for high queue depth seeks. In FIGS. 15 and 16, graphs 1500, 1600 illustrate change in IOPS versus queue depth for uncompensated device (graph 1500) and friction-compensated device (graph 1600). In both cases, the Delta (%) is determined as in Expression (1) above. For a maximum queue depth of 128, the delta of graph 1500 is −13%, −20%, and −27% for ambient temperatures of 5° C., 0° C., and 15° C., respectively. The delta of graph 1600 at maximum queue depth is −8%, −12%, and −15% for ambient temperatures of 5° C., 0° C., and 15° C., respectively.

Figure 17:
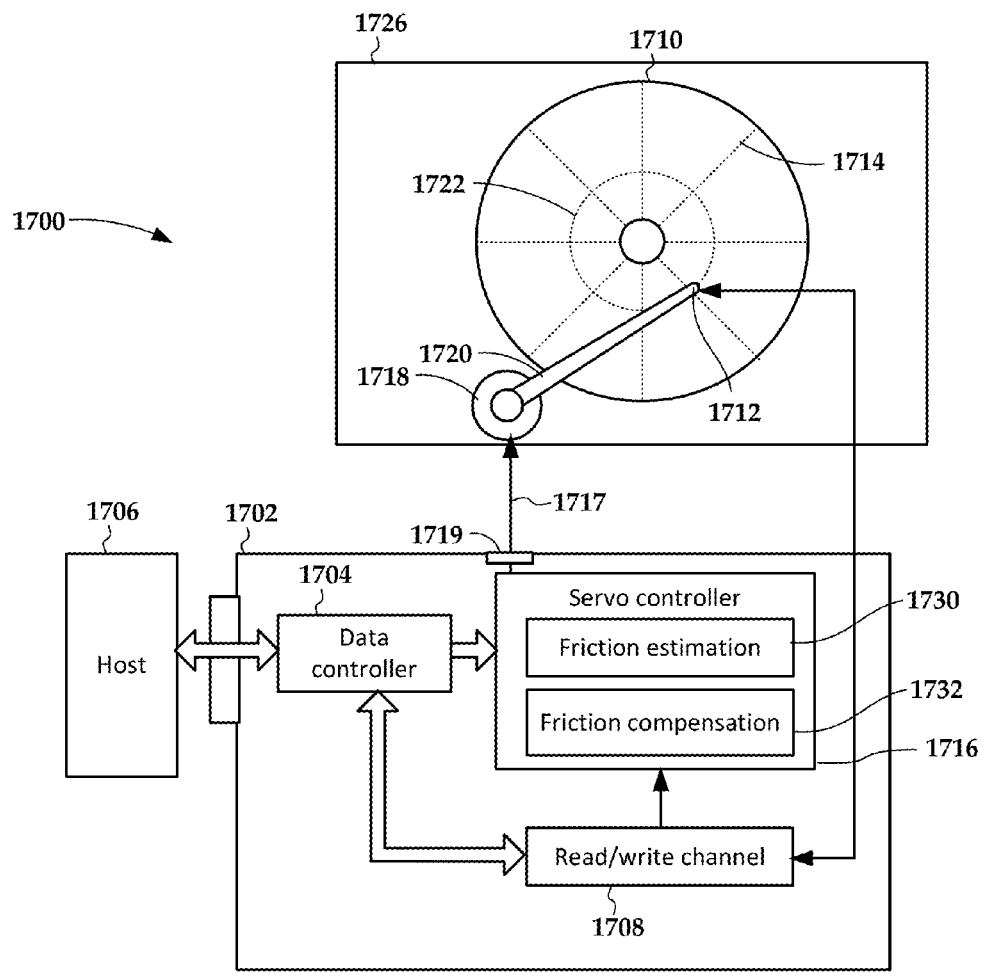
FIG. 17 is a block diagram of an apparatus according to an example embodiment.

While the friction-compensating servo control systems described above may be used in any positioning application, various features are described in the context of a hard disk drive. In FIG. 17, a block diagram illustrates a control logic circuit 1702 of a hard disk drive apparatus 1700 according to an example embodiment. The circuitry 1702 includes a data controller 1704 that processes read and write commands and associated data from a host device 1706. The host device 1706 may include any electronic device that can be communicatively coupled to store and retrieve data from a data storage device, e.g., a computer. The data controller 1704 is coupled to a read/write channel 1708 that reads from and writes to a surface of a magnetic disk 1710.

The read/write channel 1708 generally converts data between the digital signals processed by the data controller 1704 and the analog signals conducted through one or more read/write heads 1712 during read operations. To facilitate the read operations, the read/write channel 1708 may include analog and digital circuitry such as preamplifiers, filters, decoders, digital-to-analog converters, timing-correction units, etc. The read/write channel 1708 also provides servo data read from servo wedges 1714 on the magnetic disk 1710 to a servo controller 1716. The servo controller 1716 uses these signals to provide a voice coil motor control signal 1717 to a VCM 1718. The control signals 1717 are processed (e.g., converted from digital-to-analog, amplified, filtered, etc.) via control interface circuitry 1719 that is coupled to the servo controller 1716. In response to the control signal 1717, the VCM 1718 rotates an arm 1720 upon which the read/write heads 1712 are mounted.

Data within the servo wedges 1714 is used to detect the location of a read/write head 1712 relative to the magnetic disk 1710. The servo controller 1716 uses servo data to move a read/write head 1712 to an addressed track 1722 and block on the magnetic disk 1710 in response to the read/write commands (seek mode). While data is being written to and/or read from the disk 1710, the servo data is also used to maintain the read/write head 1712 aligned with the track 1722 (track following mode).

The movement of the read/write head 1412 can be affected by temperature-dependent friction affecting the VCM 1718. To counter the effects of this friction, a friction estimation module 1730 estimates inertial and hydrodynamic friction affecting the VCM 1718. A friction compensation module 1732 modifies the servo performance based on the estimated friction. For example, the friction estimation module 1730 may modify a first friction coefficient affecting a rotational velocity of the VCM 1718 and a second friction coefficient of a rotational acceleration of the VCM 1718, the first and second friction coefficients changing in response to a change in ambient temperature. The friction compensation module 1732 modifies a control effort used to control the VCM 1718 based on the modified first and second friction coefficients.

Although two separate controllers 1704 and 1716 and a read write channel 1708 have been shown for purposes of illustration, it is to be understood that their functionality described herein may be integrated within a common integrated circuit package or distributed among more than one integrated circuit package. Similarly, a head disk assembly can include a plurality of data storage disks 1710, an actuator arm 1720 with a plurality of read/write heads 1712 (or other sensors) which are moved radially across different data storage surfaces of the disk(s) 1710 by the actuator motor 1718 (e.g., voice coil motor), and a spindle motor (not shown) which rotates the disk(s) 1710.

Figure 18:
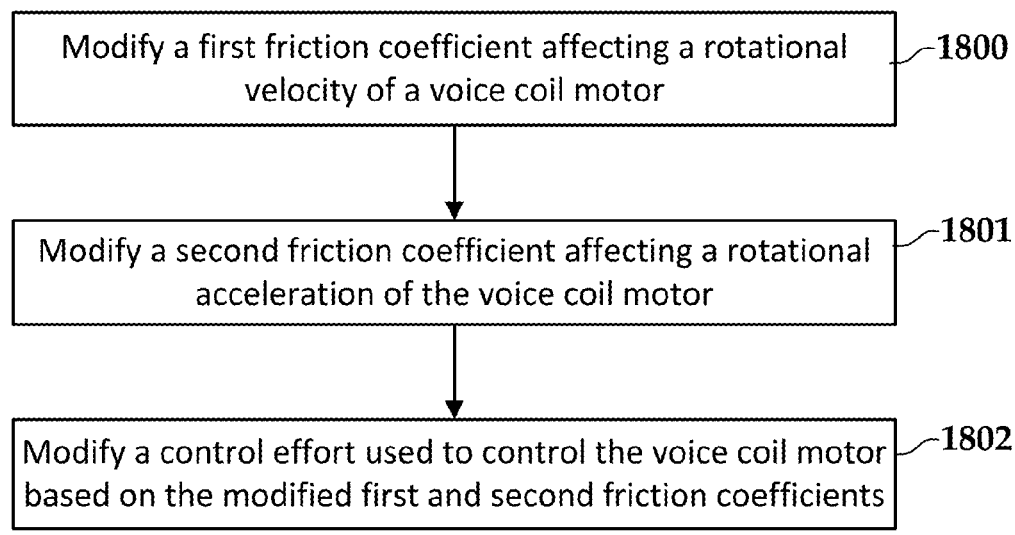
FIG. 18 is a flowchart showing a method according to an example embodiment.

In FIG. 18, a flowchart illustrates a method according to an example embodiment. The method involves modifying 1800 a first friction coefficient affecting a rotational velocity of a voice coil motor and a modifying 1801 a second friction coefficient affecting a rotational acceleration of the voice coil motor. The first and second friction coefficients change in response to a change in ambient temperature. A control effort used to control the voice coil motor is modified 1802 based on the modified first and second friction coefficients.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description. It is not intended to be exhaustive or to limit the invention to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method, comprising:
    modifying a first friction coefficient that is modeled as affecting a rotational velocity of a voice coil motor and a second friction coefficient that is modeled as affecting a rotational acceleration of the voice coil motor, the first and second friction coefficients changing in response to a change in ambient temperature; and
    modifying a control effort used to control the voice coil motor based on the modified first and second friction coefficients.

2. The method of claim 1, wherein the first friction coefficient comprises a non-linear function of the rotational velocity.

3. The method of claim 2, wherein the first coefficient comprises an exponential function.

4. The method of claim 3, wherein the first coefficient is of the form $$\sigma_v e^{-\left(\frac{v}{v_c}\right)^2}.$$

5. The method of claim 1, wherein modifying the first and second friction coefficients comprises adaptively changing the first and second friction coefficients on a per-seek basis.

6. The method of claim 1, wherein modifying the first and second friction coefficients comprises determining adaptive parameters $X_{avg}^v$ and $X_{avg}^a$ that are both based on a summation of position error signal values for previous seeks.

7. The method of claim 6, wherein the summation of the position error signal values is performed only for seek velocities that exceed a threshold.

8. The method of claim 1, wherein the first and second friction coefficients change in response to a bearing grease of the voice coil motor, properties of the bearing grease changing in response to the change in ambient temperature.

9. An apparatus, comprising:
    control interface circuitry that processes signals sent to a voice coil motor; and
    a servo controller coupled to the control interface circuitry and configured to:
        modify a first friction coefficient that is modeled as affecting a rotational velocity of the voice coil motor and a second friction coefficient that is modeled as affecting a rotational acceleration of the voice coil motor, the first and second friction coefficients changing in response to a change in ambient temperature; and
        modify a control effort used to control the voice coil motor based on the modified first and second friction coefficients.

10. The apparatus of claim 9, wherein the first friction coefficient comprises a non-linear function of the rotational velocity.

11. The apparatus of claim 10, wherein the first coefficient comprises an exponential function.

12. The apparatus of claim 11, wherein the first coefficient is of the form $$\sigma_v e^{-\left(\frac{v}{v_c}\right)^2}.$$

13. The apparatus of claim 9, wherein modifying the first and second friction coefficients comprises determining adaptive parameters $X_{avg}^v$ and $X_{avg}^a$ that are both based on a summation of position error signal values for previous seeks.

14. The apparatus of claim 13, wherein the summation of the position error signal values is performed only for seek velocities that exceed a threshold.

15. The apparatus of claim 10, wherein the first and second friction coefficients changing change in response to a bearing grease of the voice coil motor, properties of the bearing grease changing in response to the change in ambient temperature.

16. An apparatus, comprising:
- control interface circuitry that processes signals sent to a voice coil motor; and
- a servo controller coupled to the control interface circuitry and comprising:
  - a friction estimator configured to adaptively determine a temperature-dependent friction affecting the voice coil motor, the temperature-dependent friction determined based on a first friction coefficient that is modeled as affecting a rotational velocity of the voice coil motor and a second friction coefficient that is modeled as affecting a rotational acceleration of the voice coil motor, the first friction coefficient comprising a non-linear function of the rotational acceleration; and
  - a friction compensator configured to modify a control effort used to control the voice coil motor based on the temperature-dependent friction.

17. The apparatus of claim 16, wherein the first coefficient comprises an exponential function.

18. The apparatus of claim 17, wherein the first coefficient is of the form $$\sigma_v e^{-\left(\frac{v}{v_c}\right)^2}.$$

19. The apparatus of claim 16, wherein the first and second friction coefficients are determined based on adaptive parameters $X_{avg}^{\ v}$ and $X_{avg}^{\ a}$ that are both determined from a summation of position error signal values for previous seeks.

20. The apparatus of claim 19, wherein the summation of the position error signal values is performed only for seek velocities that exceed a threshold.

* * * * *